United States Patent [19]

Knight

[11] 3,857,047

[45] Dec. 24, 1974

[54] DETECTOR EMPLOYING A CURRENT MIRROR

[75] Inventor: Mark Berwyn Knight, North Caldwell, N.J.

[73] Assignee: RCA Corporation, New York, N.Y.

[22] Filed: June 8, 1973

[21] Appl. No.: 368,176

[52] U.S. Cl. ............ 307/231, 307/235 R, 329/101, 330/30 D

[51] Int. Cl. .......................... H03k 9/02, H03d 1/18

[58] Field of Search....... 307/231, 235 R; 330/30 D; 329/101, 192, 206

[56] References Cited

UNITED STATES PATENTS

| | | | |
|---|---|---|---|
| 3,610,955 | 10/1971 | Blaser et al. | 330/30 D |
| 3,614,645 | 10/1971 | Wheatley, Jr. | 330/30 D |
| 3,699,464 | 10/1972 | Zobel | 330/30 D |
| 3,735,151 | 5/1973 | Frederiksen et al. | 330/30 D |

*Primary Examiner*—John Zazworsky
*Attorney, Agent, or Firm*—H. Christoffersen; S. Cohen

[57] ABSTRACT

A differential amplifier is connected at one output terminal to the input terminal of a current mirror and at its other output terminal to the second terminal of the current mirror and to a load in shunt with the current mirror. In response to one polarity of an input signal applied to the amplifier, the current mirror saturates receiving substantially all of the amplifier current. In response to another polarity of the input signal, the current mirror operates in a linear mode receiving a portion of the amplifier current, and the shunt load receives the remaining current. In one embodiment the shunt load includes a series connected diode and resistor.

16 Claims, 2 Drawing Figures

DETECTOR EMPLOYING A CURRENT MIRROR

The invention herein described was made in the course of or under a contract or subcontract thereunder with the Defense Civil Preparedness Agency.

This invention relates to detector circuits and particularly to detector circuits employing current mirrors.

The use of detectors are well known. A simple form of detector comprises a diode serially connected between an input terminal and an output terminal with a load resistor coupled between the output terminal and ground. An alternating current input signal applied to the input terminal produces a corresponding unidirectional current in the load resistor. Such a detector is useful in many applications; however, it does not work well in cases where the input signal to be detected is of a magnitude smaller than forward voltage drop across the diode.

Another disadvantage of the simple diode detector is that when it is driven from a voltage source, as is customary, the nonlinear impedance inherent in the diode's forward transfer characteristic produces distortion in the output signal. This distortion can be minimized if the input signals are relatively large, but it will always be present and cannot be eliminated from the output as long as the diode is driven from a voltage source.

Signal distortion due to the nonlinear characteristics of the simple diode detector may be eliminated entirely by driving the diode detector with a current source rather than a voltage source. The diode performs its normal function of allowing only unilateral current flow in the load resistor but since this current is representative of the input signal, non-linear voltage drops appearing across the diode do not appear in the output signal. Furthermore, when the load includes a capacitor in shunt with the resistor, a voltage source can charge the capacitor quickly, but it discharges relatively slowly through the load resistor. In the presence of brief pulse inputs as from impulsive noise, therefore, the output signal tends to be related to the peak input signal and is unduly sensitive to such low-energy pulse inputs. When driven by a current source, the diode, resistor, capacitor circuit produces an output proportional to the average (not peak) amplitude of the signal input and thus discriminates against impulse noise present in the input signal.

A prior art method of driving a diode detector with a current source consisted of connecting a diode and load resistor in series between the output terminal and inverting input terminal of an operational amplifier. This technique provides both amplification of the input signal to be detected and current drive for the diode detector producing an undistorted, rectified output signal across the load resistor. Principal limitations of this prior art approach are that the resulting circuit is complex, costly and requires careful attention to stability criteria. For example, operational amplifiers customarily require frequency compensation networks to assure unconditional stability when their feedback loops are closed. Also, to obtain maximum linearity, the closed loop gain must be substantially lower than the maximum available open loop gain.

A need exists for a simple low distortion current driven diode detector which is operable with small input signals. It would be particularly desirable if such a detector could be fabricated as an integrated circuit utilizing few components and without requiring the use of negative feedback and frequency compensation components normally associated therewith.

In a preferred embodiment of the present invention, a current source provides an operating current to a current divider which proportions the operating current between two paths in response to a control signal. A current mirror responsive to the two path currents operates in a saturated mode under one distribution of the currents and operates in a linear mode under another distribution of the currents. In its saturated mode, the current mirror receives substantially all the current from each path. In its linear mode the current mirror causes a portion of the current in one of the paths to be diverted to a load for producing an output voltage across the load representative of the diverted current.

The invention is illustrated in the accompanying drawing wherein like reference numbers correspond to like elements and of which:

Figure 1:
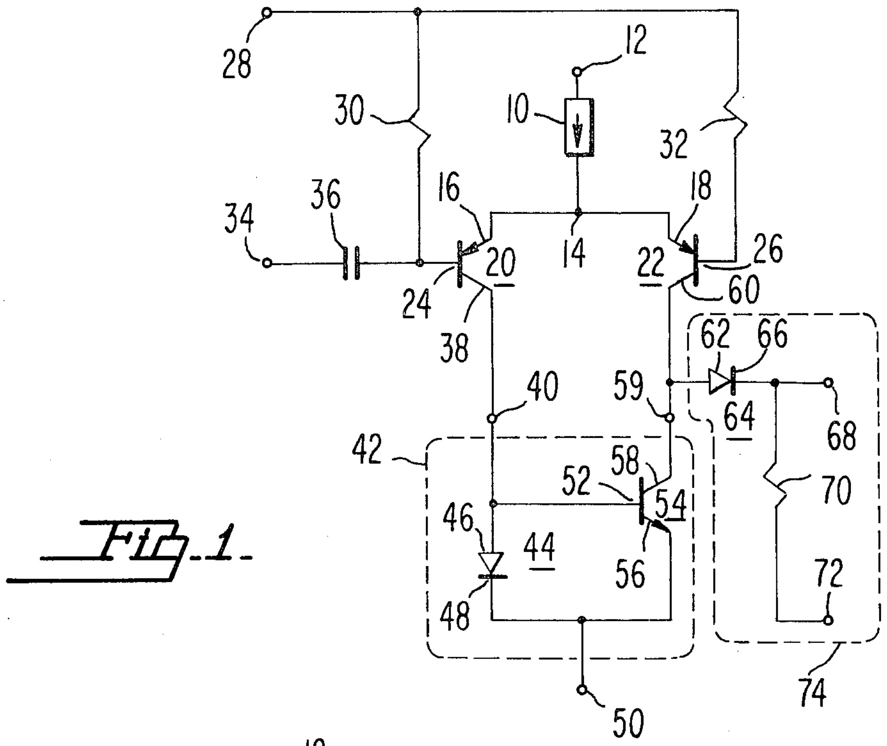
FIG. 1 is a circuit diagram of one embodiment of the invention.

In FIG. 1 current source 10 is coupled between circuit point 12 and circuit point 14. Emitters 16 and 18 of transistors 20 and 22, respectively, are also coupled to circuit point 14. Base 24 of transistor 20 and base 26 of transistor 22 are each coupled to circuit point 28 by resistors 30 and 32, respectively. Circuit point 34 is connected to base 24 by capacitor 36. Collector 38 of transistor 20 is coupled to input terminal 40 of current mirror 42.

The current mirror comprises a diode 44 connected at its anode 46 to input terminal 40 and at its cathode 48 to circuit point 50. The diode is connected in parallel with the base 52 to emitter 56 junction of an NPN transistor 54. Collector 58 of transistor 54 is coupled to output terminal 59 of the current mirror 42.

The load circuit 74 comprises a diode 64 which is connected at its anode 62 to output terminal 59 of the mirror and at its cathode to circuit point 68 and through resistor 70 to circuit point 72.

In the following discussion of the operation of the circuit of FIG. 1, assume that circuit points 72 and 50 are connected to a point of reference potential such as ground, that circuit point 28 receives a relatively positive potential and circuit point 12 receives a potential more positive than that of circuit point 28. Under static operating conditions, that is, with no signal applied to circuit point 34, current source 10 applies an operating current to circuit point 14. Thus current divides into two paths; the first the emitter-to-collector conduction path transistor 20 and the second, the emitter-to-collector conduction path transistor 22. Transistors 20 and 22 are biased at substantially the same level by the action of resistors 30 and 32, respectively. Assuming that transistors 20 and 22 have substantially similar characteristics as they do when fabricated as a monolithic integrated circuit, each will conduct substantially the same current, that is, each will conduct one half of the current provided by current source 10.

The current mirror 42 is of a class of circuits which produce an output current that is substantially a "mirror image" of an input current applied to the circuit. That is, under normal operating conditions the output terminal will receive a current substantially equal to the current supplied to the input terminal of the current mirror. Inasmuch as current mirrors are well understood in the art only a brief description of the particular current mirror 42 selected for illustrative purposes in FIG. 1 will be given here.

Current from the collector to emitter path of transistor 20 flows through diode 44 to circuit point 50 producing a voltage at input terminal 40 which is applied to base electrode 52 of transistor 54. This voltage biases transistor 54 in conduction. If an operating current is available at collector 58 of transistor 54, that transistor will conduct an amount of current which is a function of certain parameters of the diode 44 and the base-emitter diode of transistor 54. If diode 44 and the base-emitter diode of transistor 54 are substantially similar (for example, if both are of the same semiconductor material with similar junction areas and operating under isothermal conditions) the current in the collector to emitter path of transistor 54 will be substantially similar to the current applied to control terminal 40 from the collector to emitter path of transistor 20.

In other words, under the assumptions given, and under static operating conditions, current source 10 produces a current which divides equally into two paths. Control terminal 40 of current mirror 42 receives substantially all of the current from the first path and forces transistor 54 to receive a current equal to the current in the first path. Since the current in the first path is equal to the current in the second path, substantially all of the current of the second path flows to the collector of transistor 54 and substantially no current is available to pass through diode 64 and load resistor 70 to circuit point 72. Circuit point 68 will, therefore, be substantially at the potential of circuit point 72. The function of diode 64 will be discussed subsequently with regard to the dynamic operating characteristics of the circuit in FIG. 1.

Consider next the case in which an input signal voltage of relatively increasing value is applied to circuit point 34. The signal will be conducted through capacitor 36 to base 24 of transistor 20 and will tend to reduce the forward bias supplied to transistor 20. Since the potential applied to base 26 of transistor 22 is unchanged, the current from current source 10 will divide unequally between the two transistors. A relatively smaller current will flow through the emitter to collector path of transistor 20 and a relatively larger current will flow through the emitter to collector path of transistor 22. Substantially all of the smaller current flows to control terminal 40 of current mirror 42 which, as previously explained, produces a collector to emitter current in transistor 54 equal to the emitter to collector current of transistor 20. However, transistor 22 conducts more than this amount of current into node 59. As the excess current cannot pass into the transistor 54, it flows through diode 64 and load resistor 70 to circuit point 72, producing an output voltage at output terminal 68. The output current flowing through load resistor 70 thus represents the difference between the current received by transistor 54 of the current mirror and the current provided by transistor 22. If, as was assumed, the current received by the current mirror is substantially equal to the current supplied to control terminal 40, the current through load resistor 70 will thus be equal to the difference between the emitter to collector currents of transistors 20 and 22.

An important feature of the circuit of FIG. 1 is that the load current flowing through resistor 70 and through forward biased diode 64 is controlled by the action of the current mirror and not by the forward transfer characteristic of the diode. Therefore, non-linearities and distortion inherent in the diode's forward bias transfer characteristic do not appear in the output voltage at circuit point 68. The usefulness of diode 64 will be explained in detail considering the next operating condition.

Consider next the case in which an input signal of a relatively decreasing value is applied to circuit point 34. In this case transistor 20 will conduct a relatively greater proportion of the current provided by current source 10 than transistor 22. The greater current flows into control terminal 40 of current mirror 42, which, in turn, would bias transistor 54 to receive a similar current from output terminal 59 if, in fact, such a current were available. Transistor 22, however, produces a smaller current than transistor 54 is capable of conducting and diode 64 is poled in such a direction as to prevent current from circuit point 68 from flowing to transistor 54. The net result is that transistor 54 saturates and conducts all of the current available from transistor 22 whenever the value of signal applied to circuit point 34 causes a greater current to flow in the first path (16, 38) than the second path (18, 60). Under such a condition, the potential at the collector 58 of transistor 54 will thus be nearly equal to the potential at circuit point 50 and substantially no current will flow through load resistor 70.

Diode 64 performs two functions in the present invention. One is the prevention of reverse current flow from circuit point 68 to collector 58 of transistor 54. This function is of special importance when a capacitive load is connected across load resistor 70 as it may be in an amplitude modulation detector for fitering carrier frequencies from the desired modulation envelope. The diode prevents the discharge of the capacitor into the detector circuit, thereby providing proper circuit operation.

Another function that diode 64 performs, when transistor 54 is saturated, is that of providing a voltage reduction to substantially offset the saturation voltage produced by transistor 54. When transistor 54 is operating at saturation it acts like a low impedance - a voltage source. Now the non-linearity of the diode does affect the circuit operation. At the voltage levels involved (node 59 close to ground, say 200 millivolts or so, and terminal 72 at ground) the forward impedance of the diode 64 is very high (it is operating beneath the knee of its characteristic). This very high impedance forms one part of a voltage divider with resistor 70 (which is of a substantially lower value of resistance) so that the voltage developed at output terminal 68 is only a small fraction of the saturation voltage. Of course, as previously explained, when the current mirror is operating in its linear mode (transistor 54 unsaturated) resistor 70 is current driven and nonlinearities of the diode will not affect the voltage produced across load resistor 70.

Figure 2:
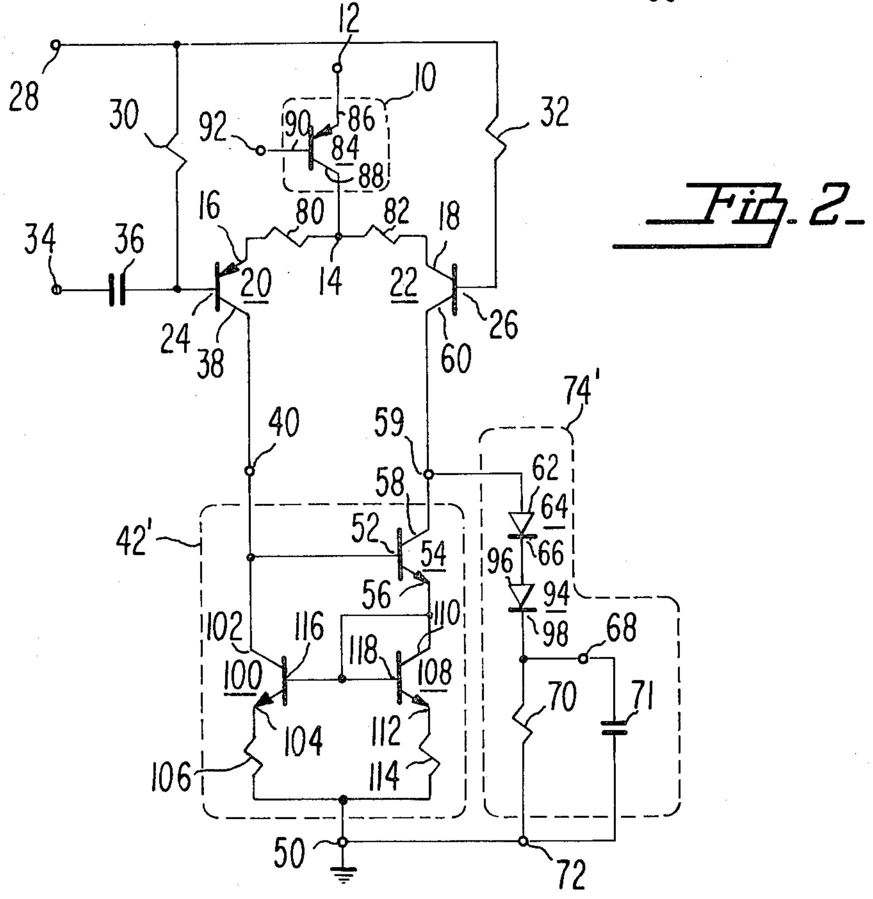
FIG. 2 is a circuit diagram of another embodiment of the invention.

The embodiment of the present invention shown in FIG. 2 is similar to that of FIG. 1 but additionally includes emitter resistors 80 and 82, each separately coupling circuit point 14 to emitters 16 and 18, respectively. Current source 10 includes transistor 84 having its emitter 86 and collector 88 coupled to circuit points 12 and 14, respectively. Base electrode 90 of transistor 84 is coupled to control terminal 92. Load circuit 74' additionally includes diode 94 having the anode 96 coupled to cathode 66 of diode 64 and the cathode 98 coupled to circuit point 68. The load circuit also includes a capacitor 71 connected in parallel with resistor 70.

Current mirror 42' includes transistor 100 in place of diode 44 with its collector 102 and emitter 104 coupled between input terminal 40 and one end of additional resistor 106. The other end resistor 106 is coupled to circuit point 50. An additional transistor 108 has its collector 110 and emitter 112 coupled between emitter 56 of transistor 54 and one end of an additional resistor 114. The other end of resistor 114 is coupled to circuit point 50. Circuit point 50 is coupled to circuit point 72. Base electrodes 116 and 118 of transistors 100 and 108, respectively, are each coupled to collector 110 of transistor 108.

Operation of the circuit of FIG. 2 is substantially the same as that of FIG. 1. Transistors 20 and 22 divide the current produced by current source 10 into two paths and proportion the current therebetween in response to an input signal applied to circuit point 34. The addition of emitter degeneration resistors 80 and 82 serves to equalize the characteristics of transistors 20 and 22 in a manner well known in the art.

Current source 10 which could be, for example, a relatively high valued resistor, is represented by transistor 84. This transistor may be biased in different ways to produce a constant current between circuit points 12 and 14. For example, a resistor may be coupled between circuit point 12 and a fixed operating potential. A relatively negative bias applied to control terminal 92 will bias transistor 84 to produce a constant current substantially equal to the difference between the fixed operating potential and the bias applied to control terminal 92 divided by the value of the resistor chosen. On the other hand, transistor 84 might be employed as the output transistor of a current mirror in a manner well known in the art. Regardless which technique is used, the primary requirement for current source 10 is that it produces a substantially constant operating current between circuit points 12 and 14 which is relatively unaffected by the potential therebetween.

The current mirror 42' of FIG. 2 performs substantially the same function as that of FIG. 1. Operation of this mirror is described in detail in U.S. Pat. No. 3,588,672 (issued to George R. Wilson on June 28, 1971.) The principle advantage of this mirror over that shown in FIG. 1 is that it provides substantially higher output impedance and is less critical of variations in the individual characteristics of the transistors employed. The high output impedance results from the feedback relationship between transistor 54 diode connected transistor 108 and transistor 100. Device characteristic matching is aided by degenerative effects provided by resistors 106 and 114.

Current mirror 42' produces an inherently higher voltage at output terminal 59 under saturation conditions than that of FIG. 1. The saturation voltage produced is equal to the sum of the saturation voltage of transistor 54, the forward biased voltage drop of diode connected transistor 108 and the saturation current induced voltage drop across resistor 114. Since this saturation voltage is higher than that of FIG. 1 an additional diode 94 has been included in the output circuit 74 to offset the higher saturation voltage.

The function of capacitor 71 coupled across load resistor 70 is to provide low-pass filtering of the current mirror output current when the circuit of FIG. 2 is used as a detector for amplitude modulated input signals applied to input terminal 34. The output impedance provided at circuit point 59 is relatively high compared to the value of load resistor 70, therefore, the filter cut-off frequency is substantially solely determined by the values of resistor 70 and capacitor 71. The effect of capacitor 71 is to provide an output signal proportional to the average (not peak) amplitude of the input signal thus discriminating against low energy impulse noise in AM detector applications.

It will be appreciated by those skilled in the art that various modifications may be made to the embodiments of the invention herein shown and described. For example, each of the circuits shown has a dual obtained by simply reversing the transistor types, diode polarization and relative reference potentials. Further, other well known forms of suitable current mirrors may be employed in the present invention other than those shown. It is also apparent that the input signal may be applied differentially to the current divider transistors rather than in single-ended fashion as shown.

What is claimed is:

1. A detector for amplitude modulated input signals comprising:

- current source means for producing an operating current;
- current divider means for dividing said operating current into first and second paths and proportioning the current therebetween in response to said amplitude modulated input signal;
- a circuit node for receiving the second path current;
- a current mirror having an input terminal for receiving the first path current, a common terminal for receiving a reference potential, and an output terminal connected to said node; and
- diode means and load means connected in series between said node and said common terminal, said diode means for causing said current mirror to saturate and clamp said node to said common terminal at a saturation voltage level characteristic of said current mirror when said first path current exceeds said second path current, said diode means further providing an offsetting potential drop when said mirror is saturated for minimizing saturation voltage induced current flow to said load, said diode means enabling linear operation of said current mirror when the second path current exceeds the first path current by conducting excess second path current, not received by said mirror, to said load thereby producing an output voltage across said load linearly related to said excess current.

2. The detector recited in claim 1 further comprising a circuit output terminal and wherein said diode means comprises at least one diode connected between said node and said output terminal and wherein said load means comprises a resistor connected between said output terminal and said common terminal.

3. The combination recited in claim 1 wherein said current source means comprises at least one transistor having a conduction path and a control electrode for controlling the conduction of the path, said conduction path coupled between a point of fixed operating potential and a circuit point in said current divider means, said control electrode responsive to a bias signal of a value for maintaining said operating current through said conduction path representative of said bias signal.

4. The combination recited in claim 3 wherein said transistor is a bipolar transistor having base, emitter and collector electrodes, the emittter and collector electrodes coupled to said point of fixed operating potential and said circuit point in said current divider means, respectively, the base electrode coupled to a bias point for receiving said bias signal.

5. The combination recited in claim 3 wherein said current divider means comprises:

first and second transistors, each having base, emitter and collector electrodes;

means for applying a quiescent bias current to each of said base electrodes;

means for conducting said amplitude modulated input signal to a selected one of said base electrodes; and means for conducting said operating current to each emitter electrode of said first and second transistors.

6. The combination recited in claim 5 wherein said means for applying a quiescent bias current to each of said base electrodes comprises separate resistors coupled between each base electrode and a reference potential point.

7. The combination recited in claim 5 wherein said means conducting said operating current comprises a separate resistor coupled between said circuit point in said current divider means and each emitter electrode.

8. The combination recited in claim 5 wherein said means conducting said amplitude modulated input signal to a selected one of said base electrodes comprises a capacitor coupled between a signal input terminal and said selected one of said base electrodes.

9. The combination recited in claim 4 wherein said current mirror comprises:

an output transistor having base, emitter and collector electrodes, the collector electrode coupled to said output terminal and to the collector of the second transistor of the current divider means, the emitter coupled to said common terminal, the base coupled to said input terminal; and at least one semiconductor device coupled between said input terminal and said common terminal and arranged to regulate the potential at the base of the current mirror output transistor in accordance with current received by said input terminal, said input terminal being coupled to the collector electrode of the first transistor of said current divider means.

10. The combination recited in claim 9 wherein said semiconductor device comprises a diode poled in the same sense with respect to said reference terminal as a base-emitter diode junction associated with said current mirror output transistor.

11. The combination recited in claim 9 further comprising current sensing means coupled between said output transistor emitter and said common terminal and wherein said semiconductor device comprises another transistor the emitter-collector conduction path thereof coupled between said common terminal and said input terminal, the base thereof responsive to a signal produced by said current sensing means for regulating the current conducted by said another transistor thereby regulating the current conducted by said output transistor.

12. The combination recited in claim 2 further including a capacitor coupled in parallel with said resistor.

13. A detector circuit comprising, in combination:

a differential amplifier comprising two semiconductor devices, each in a different path, each device having an input terminal for controlling the current through its path, means supplying a constant current to the two paths, and means quiescently biasing said amplifier so that substantially equal current flows in each of said paths;

a current mirror having a common terminal and first and second input terminals, each input terminal receiving a current from a different one of said paths, the first of said input terminals of said current mirror comprising a control terminal for receiving a current which controls the amount of current which may flow into the second of said terminals;

means applying an amplitude modulated carrier to one of said input terminals of said differential amplifier;

a circuit output terminal;

a resistor and a capacitor connected in parallel between said common terminal and said output terminal; and a diode connected between said output terminal and said second terminal of said current mirror.

14. The combination recited in claim 13 wherein said two semiconductor devices comprise:

first and second transistors each having a conduction path with emitter and collector electrodes at the ends thereof and a base electrode for controlling the conduction of the path; said emitter electrodes coupled to said means for supplying a constant current to the two paths, said base electrodes coupled to said means for quiescently biasing said amplifier.

15. The combination recited in claim 14 wherein said means for quiescently biasing said amplifier comprises a pair of resistors, each coupling a separate one of said base electrodes to a reference potential terminal.

16. The combination recited in claim 15 wherein said means supplying a constant current to the two paths comprises at least one transistor having a conduction path and a control electrode for controlling the conduction of the path, said conduction path coupled at one end to said emitter electrodes and at the other end to a point of fixed operating potential, said control electrode responsive to a bias signal of a value for maintaining said constant current at a value representative of said bias signal.

* * * * *